Figure 1:
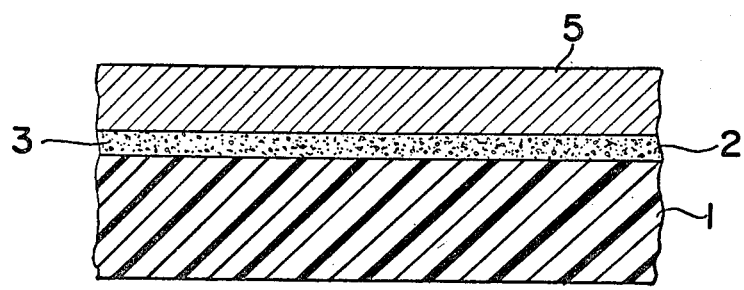

United States Patent [19]

Saito et al.

[11] 4,275,113
[45] Jun. 23, 1981

[54] MAGNETIC RECORDING MEDIUM

[75] Inventors: Osamu Saito; Jozo Shimizu; Hiroshi Zaitsu, all of Ibaraki, Japan

[73] Assignee: Hitachi Maxell, Ltd., Osaka, Japan

[21] Appl. No.: 85,585

[22] Filed: Oct. 17, 1979

[30] Foreign Application Priority Data

Oct. 17, 1978 [JP] Japan ................. 53/128148
Oct. 17, 1978 [JP] Japan ................. 53/128149
Dec. 19, 1978 [JP] Japan ................. 53/157841

[51] Int. Cl.³ ............................................. H01F 1/00
[52] U.S. Cl. ................................. 428/323; 360/131; 427/131; 428/900
[58] Field of Search ............ 428/900, 323, 329, 530, 428/480; 427/131, 128; 360/134, 135, 136, 131

[56] References Cited

U.S. PATENT DOCUMENTS

| 3,440,091 | 4/1969 | Delmore | 428/336 |
| 4,035,547 | 7/1977 | Hellez, Jr. et al. | 428/323 |
| 4,132,827 | 1/1979 | Mukaida et al. | 428/900 |

Primary Examiner—Stanley S. Silverman
Attorney, Agent, or Firm—Birch, Stewart, Kolasch & Birch

[57] ABSTRACT

Magnetic recording medium comprising a support or carrier sheet and a magnetic layer formed on one side of the support, wherein there is provided between the support and the magnetic layer at least one intermediate layer of resinous polymeric material including particles of carbon black having large specific surface area and high oil absorption so that electrification of the recording medium can be prevented with good adhesiveness of the magnetic layer to the support.

6 Claims, 3 Drawing Figures

MAGNETIC RECORDING MEDIUM

FIELD OF THE INVENTION

The present invention relates to magnetic recording medium, and particularly to magnetic recording medium having low surface resistivity of the magnetic layer with high quality of electro magnetic properties and adhesiveness between the magnetic layer and a carrier sheet.

BACKGROUND OF THE INVENTION

Conventionally, magnetic recording medium is composed of a support or carrier sheet or strip (referred to as carrier strip hereinafter) made of a material such as a polyester film and a magnetic layer formed on the carrier strip by way of coating a magnetic powder with an adhesive synthetic resin. However in conventional recording medium, said magnetic layer is readily electrified because of its high surface resistivity, resulting in either generation of noise due to discharge of the electricity, or drop out of signal by dust attracted to the recording medium when reproduced.

In order to decrease the surface resistivity of the magnetic recording medium, it is known (a) to add carbon black into the magnetic layer (b) to provide conductive layer including carbon black between the carrier strip and the magnetic layer.

However, according to method (a), the density of the magnetic powder in the magnetic layer is lowered by the addition of carbon black of relatively particle size, and also the sensitivity of the magnetic recording medium tends to be lowered. In addition, the surface of the magnetic layer becomes relatively rough, thereby resulting in increasing of the output fluctuation and noise of the magnetic recording medium when it is reproduced.

The method of (b), which is disclosed in U.S. Pat. No. 3,440,091 serves to avoid problem of decrease of density of magnetic powder dispersed in the magnetic layer.

However, according to this method, in order to decrease the surface resistivity of the magnetic layer to $10^{10}\Omega$ or more, preferably to $10^{9}\Omega$ for preventing electrification of the recording medium, it is necessary to add carbon black in the conductive layer in an amount of more than 40% by weight. However, such a large amount of carbon black causes the surface of the conductive layer to be relatively rough, whereby the surface of the magnetic layer is badly affected, thereby causing the output uniformity of the recording medium to become worse.

In addition, as the amount of carbon black added in the conductive layer increases, namely, the amount of the binder agent decreases, the adhesiveness between the conductive layer and the carrier sheet may be weaken, the then a part of the magnetic layer tends to separate from the conductive layer during the scanning of the recording medium by a recording head, thereby resulting in a drop out of the signal.

OBJECTS OF THE INVENTION

An essential object of the present invention is to provide a magnetic recording medium which enables one to avoid the problem of electrification of the recording medium and maintaining a good uniformity of the surface thereof, thereby enabling the suppress ion of the electrostatic noise induced in the magnetic recording medium due to electrification.

Another object of the present invention is to enhance the adhesiveness of the magnetic layer to the carrier strip and to suppress the electrification of the recording medium, thereby enabling one to suppress the so called drop out of the signal caused by the peeling off or separation of the magnetic layer from the carrier strip.

SUMMARY OF THE INVENTION

In order to achieve those objects, according to the present invention, there is provided at least one intermediate layer with electrical conductivity between the magnetic layer and the carrier strip of the recording medium, and carbon black, having a large specific surface area and a high oil absorption is added as the conductive material in the intermediate layer.

As a result of investigation by the present inventors of the recording medium so as to eliminate such drawbacks as described above inherent in the conventional magnetic recording medium made by method (b), the present inventors have discovered that the use of carbon black with specified characteristics serves to decrease the surface resistivity of the recording medium with a small amount of carbon black so that electrification of the magnetic recording medium can be effectively prevented with enhancement of output uniformity.

According to the present invention there is provided a magnetic recording medium comprising an intermediate layer formed between the support and the magnetic layer, said intermediate layer comprising particles of carbon black which act as an electric conductive material with either a specific surface area of not less than 700 m$^2$/g and an oil absorption of not less than 300 ml (DBP)/100 g, said carbon black being adapted to be present in an amount of 5 through 30% by weight. (DBP) means Di Buthyl Phthalate.

According to the preferred embodiment of the present invention, carbon black with the above mentioned charasteristics with a particle size not more than about 30 m$\mu$ (milimicron) is used. One example of such carbon black conventionally available is KETJEN BLACK E.C. of AKZO in the Netherland.

Considering that carbon black conventionally used in the magnetic recording medium is in such range of 5 to 500 m$^2$/g of specific surface area and 50 to 260 ml(DBP)/100 g of oil absorption, it is understood that the carbon black used in the present invention has very specific characteristics. By using carbon black with such specific characteristics, it becomes possible to lower the surface resistivity of the magnetic layer to the desired low value even if the amount of the carbon black to be added in the intermediate layer is smaller than that of the carbon black conventionally used. In addition, according to the present invention, since the amount of the carbon black to be added is decreased, the surface of the magnetic layer is not badly affected, whereby the output uniformity of the recording medium is not adversely affected.

According to the present invention, the amount of the carbon black contained in the intermediate layer is designated within 5% through 30% by weight preferrably 10% through 20% by weight. When the amount of the carbon black is decreased below 5% by weight, the surface resistivity is not considerably lowered. On the other hand it is not desirable to use carbon black in an amount of more than 30% by weight, because the adhesiveness between the carrier strip and the intermediate layer may be weaken.

In order to prepare the magnetic recording medium according to the present invention, said intermediate layer including carbon black specified within various ranges as described above is formed on the carrier strip or carrier sheet made of a polyester film or an acetate film, then the magnetic layer is coated on the intermediate layer by a conventional method. However, it is noted that when polyethylene telephthalate film is used as a carrier strip, since the degree of crystallinity of polyethylene telephthalate is high, there occurs the problem that the adhesiveness between the intermediate layer and the carrier strip is weak and less than the adhesiveness between the magnetic layer and the intermediate layer, so that the magnetic layer can be easily separated from the carrier strip.

From the point of this view, it is preferred to select the binder agents of the intermediate layer.

According to the inventors' experiments, it is suitable to use as a binder for the intermediate a polyester resin having a high molecular weight, a cross-linked polyurethane resin, polyvinyl formal and a poly hydroxypolyester resin. Particularly polyester resins of high molecular weight are preferred.

As a polyester resin of high molecular weight, it is preferred to use polyester resins with a molecular weight of 10,000 through 20,000, including telephthalic acid. For this purpose, VYLON 200 (TOYOBO CO. LTD. molecular weight 15,000 to 20,000), VYLON 300 (molecular weight 15,000 to 20,000), SP-211 (Hitachi Chemical Co. Ltd. molecular weight 13,000 to 17,000) and SP-212 (molecular weight 13,000 to 17,000) are conventionally available.

Since such polyester resins of high molecular weight used as the binder agents of the intermediate layer is similar in molecular structure to polyester resins used in the carrier strip, the adhesiveness between the intermediate layer and the carrier strip is strong and since the binder agents are amorphous, the adhesiveness between the intermediate layer and the magnetic layer is also strong. Due to the strong adhesive bond, the magnetic layer and the carrier strip is bonded strongly through the intermediate layer so that the magnetic layer can be prevented from being seperated from the carrier strip as in the recording medium made by the conventional method.

As the cross linked polyurethane resin, there are used humid cross-linked polyurethane which has isocianate base at the molecular ends and is cross linked by means of water included in air or thermosetting polyurethane bases such as polyester, polyether-polyurethane or polyester-polyurethane which has hydroxy groups. In the case where the thermosetting polyurethane base is used, the isocianate compound is used jointly therewith and the hydroxy in the polyurethane base is adapted to be reacted with the isocianate compound.

Examples of humid cross-linked polyurethane are as follows:
(a) Takenate M-407, Takeda Chemical Industries, Ltd.
(b) Crisvon 4565, DAINIPPON INK AND CHEMICALS, INC.

Examples of thermosetting polyurethane base are as follows:
(a) DESMOPHÖN 1200, Bayer A. G.
(b) Crisvon 7209; Crisvon 6407; Crisvon 6107, DAINIPPON INK AND CHEMICALS, INC.

Examples of isocianate compound used jointly with thermosetting polyurethane base are as follows;
(a) DESMODUR L, Bayer A. G.
(b) COLONATE L, Nippon Polyurethane Co.

Polyvinylformal preferably used in the invention is prepared by saponifying polyvinylacetate to obtain polyvinylalcohol and then formalizing the obtained polyvinylalcohol and has a small number of acetate groups and hydroxy groups.

Examples of polyvinylformal conventionally available are DENKA FORMAL #20, ditto #30, ditto #100, ditto #200 of DENKI KAGAKU KOGYO KABUSHIKI KAISHA.

As typical polyhydroxy-polyether-polyester resin, there is such compound as follows;

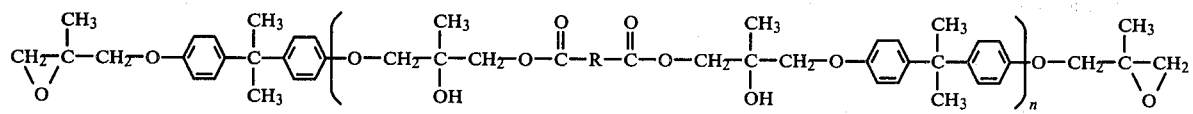

(wherein molecular weight is not more than 40,000.)

Examples of such compound conventionally available are DIC EPICLON 1030; DIC EPICLON 4030; DIC EPICLON H 030 of DAINIPPON INK AND CHEMICALS, INC.

These binder agents have an affinity not only with the carrier strip of polyester but also with the magnetic layer so that according to the magnetic recording medium of the present invention, the said magnetic layer and the carrier strip are bonded together strongly through the intermediate layer, thereby resulting in preventing the magnetic layer from being separated away from the carrier strip.

The same result can be obtained when various agents described as above are mixed.

On the other hand, in the intermediate layer, when carbon black particles are biased towards the magnetic layer, said carbon black particles contact each other, so that not only does the surface resistivity of the magnetic layer become low but also the adhesiveness between the intermediate layer and the carrier strip becomes strong to prevent the magnetic layer from being seperated from the carrier strip.

It is appreciated that the inventors found that in the magnetic recording medium wherein the magnetic layer is coated on the intermediate layer which is formed on the carrier strip made of polyethylene telephthalate film, the adhesiveness between the carrier strip and the intermediate layer contributes to prevent the magnetic layer from being separated from the carrier much more than the adhesiveness between the intermediate layer and the magnetic layer, so that by dispersing carbon black particles to be biassed towards the magnetic layer as described above, the adhesiveness of the magnetic layer to the carrier strip can be much improved and the surface resistivity is effectively decreased.

In addition, it is also appreciated that the present inventors found that the light transmittance of the magnetic layer can be much decreased by dispersing carbon black particles having a specific surface area of not less than 700 m²/g and oil absorption of not less than 300 ml(DBP)/100 g in the intermediate layer so that the magnetic layer portion can be easily detected by means of light detecting means.

Ordinary magnetic recording tape has transparent leader tape with it's end portions adapted to detect both ends of the recordable portion by means of light detecting means. In such a recording tape, in case where differences of light transmittance of the recording portion and the leader tape are small, and when the leader tape is stained, automatic detection of the recordable portion may become difficult thereby resulting in mulfunction.

However, the magnetic recording medium according to the present invention provides low light transmittance at it's recordable portion, whereby malfunction can be effectively avoided.

One advantage of using carbon black having a large specific surface area and oil absorption in the intermediate layer is to provide a low light transmittance without loosing good or strong adhesiveness between the magnetic layer and the carrier strip since the light transmittance can be lowered by a small amount of the carbon black particles compared with using carbon black particles ordinarily used.

As the magnetic powder used in the magnetic layer of the magnetic recording medium according to the present invention, conventional magnetic materials such as $\gamma$-$Fe_2O_3$; cobalt containing $\gamma$-$Fe_2O_3$; $Fe_3O_4$; cobalt containing $Fe_3O_4$, $CrO_2$, Fe and Fe alloys can be used.

Binder agents used in the magnetic layer are as follows; resins having good dispersion and packing such as a copolymer of vinyl chloride-vinylidene chloride; polyvinyl-butyral; cellulose derivative; urethane elastomer; a copolymer of butadiene-acrylonitrile; a thermoelastic resin such as polyester; conventional thermosetting resins; a reactive resin such as an epoxy resin, polyisocyanate-prepolymer, phenol urea or melamine resin or their mixture.

As the organic solvent, toluene, methyl iso-butyl ketone, methylethyl ketone, cyclohexanone or tetrahydrofuran are used.

For solving the resin as described above the same solvent can be selectively used from the solvents used as the solvent in the intermediate layer.

As the coating material for forming the magnetic layer, various conventional coating materials can be used.

Oil absorption of the carbon black used in the present invention is measured according to section 6-1-2 (oil absorption), K 6221 (method for testing carbon black for use in rubber) of JIS (Japanese Industrial Standard) by using Di Buthyl Phthalate (DBP).

The specific surface area of carbon black is obtained by amount of absorption of $N_2$ gas per unit weight.

PREFERRED EMBODIMENTS

Figure 2:
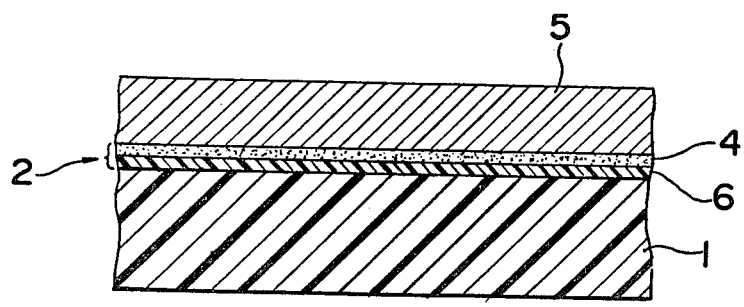
Figure 3:
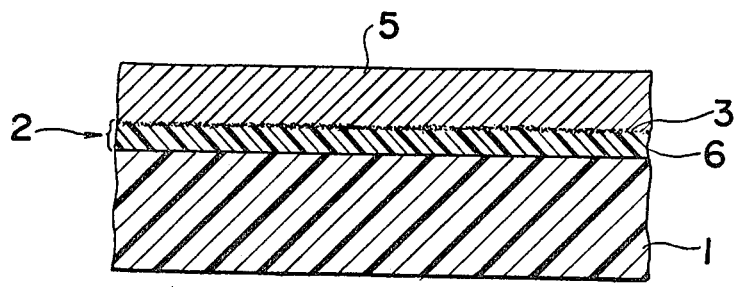

Preferred embodiments of the present invention will be described hereinafter with reference to the attached drawings in which;

FIG. 1 is a cross sectional view showing an example of the magnetic recording medium according to the present invention, FIG. 2 shows a cross sectional view of another embodiment of the present invention, and FIG. 3 shows a cross sectional view of a still further embodiment of the present invention.

Referring to FIG. 1 a carrier strip 1 made of a polyester resin such as polyethylene telephtalate has a thickness of 2 to 75$\mu$. On the carrier strip 1, an intermediate layer 2 containing particles of carbon black 3 is formed and a magnetic layer 5 is formed thereon.

The intermediate layer is formed in such a manner that the resin material having good adhesiveness with the carrier strip 1, such as a high molecular weight polyester is dissolved in a solvent into which the finely divided carbon black 3 is uniformly dispersed. The solution is coated on the carrier strip 1 so that a layer having a thickenss of 0.1 to 2.0$\mu$ when dried can be formed. By designating the thickness of the intermediate layer 2 within 0.1 to 2.0$\mu$ as described above, the adhesiveness and conductivity can be improved and the light transmittance can be lowered.

When the particle size of the carbon black used in the intermediate layer is too large, the conductivity of the intermediate layer may be undesirably reduced and the surface thereof becomes rough and in turn the surface of the magnetic layer 5 becomes rough. In order to avoid such drawbacks, carbon black having a particle size smaller than 2.0$\mu$ is to be used.

The amount of the carbon black contained in the intermediate layer 2 is preferably designated within the range of 5 to 30% by weight. If the amount of the carbon black is too small, the surface resistivity of the intermediate layer may be undesirably increased. On the other hand, if the amount of the carbon black is too much, the adhesive bond may be weak.

The magnetic layer 5 is formed by way of coating the magnetic coating material composed of a mixture of magnetic powder and binder on the intermediate layer 2. If necessary, the dispersing agent, lubricant and/or abrasives may be added to the magnetic coating material.

EXAMPLE 1

Into cyclohexanone of 200 parts by weight, Ketjen Black E.C. (carbon black, specific surface area, 1000 m²/g, oil absorption; 340 ml (DBP)/100 g, mean particle size, about 30 m$\mu$; produced by AKZO in the Netherland) and VYLON 200 (high molecular polyester resin of 15,000 to 20,000 molecular weight; produced by TOYOBO CO. LTD.) were added according to the proportions shown in the table 1.

TABLE 1

| number of samples | Ketjen Black E.C. parts by weight | VYLON 200 parts by weight |
| --- | --- | --- |
| 1 | 5 | 95 |
| 2 | 10 | 90 |
| 3 | 20 | 80 |
| 4 | 30 | 70 |

The above ingredients for each of the samples were placed in a ball mill and mill for 80 hours to prepare four kinds of the samples of coating material of sample 1, sample 2, sample 3, and sample 4.

The coating material of one of the samples is coated on a carrier sheet made of polyethylenetelephtalate film having a thickness of 11$\mu$ by way of gravure coating to provide an intermediate layer having a thickness of about 0.3$\mu$ when dried.

Meanwhile a magnetic coating material was prepared consisting of the following:

| | |
|---|---|
| powder of cobalt containing $\gamma$-Fe$_2$O$_3$ | 80 parts by weight |
| VAGH(vinyl chloride-vinyl acetate-vinyl alcohol copolymer of Union Carbide Corp.) | 12 parts by weight |
| TAKENATE L-1007 (polyurethane prepolymer of TAKEDA Chemical Industries, Ltd.) | 8 parts by weight |
| methyl iso-butyl keton | 50 parts by weight |
| toluene | 5 parts by weight |

The magnetic coating is coated on the intermediate layer 2 to form the magnetic layer having a thickness of about 6$\mu$ when dried.

Then the samples were dried and cut into predetermined width to provide the samples NO. 1 to NO. 4 of magnetic recording tape.

COMPARISON 1

A magnetic recording tape (comparison 1) was prepared in a similar manner as Example 1 except for following:

| | |
|---|---|
| Ketjen Black E.C. | 0 part by weight |
| VYLON 200 | 100 parts by weight |

COMPARISON 2

A magnetic recording tape (comparison 2) was prepared in a similar manner as Example 1 except for following:

| | |
|---|---|
| Ketjen Black E.C. | 40 parts by weight |
| VYLON 200 | 60 parts by weight |

EXAMPLE 2

A magnetic recording tape (example 2) was prepared in a similar manner as the sample NO. 2 of example 1, wherein CRISVON 4565 (humid cross linked polyurethane resin) was used in place of VYLON 200 used in the intermediate layer.

EXAMPLE 3

A magnetic recording tape (example 3) was prepared in a similar manner as the sample NO. 2 of the example 1, wherein DIC EPICLON H030 was used in place of VYLON 200 used in the intermediate layer.

COMPARISON 3

A magnetic recording tape was prepared in a similar manner as example 1 except for the following:
(a) In place of carbon black of Ketjen Black E.C., the conventional carbon black #40 manufactured and sold by Mitsubishi Chemical Industries Ltd. (specific surface area; 125 m$^2$/g, oil absorption; 135 m$^2$(DBP)/100 g, particle size; about 20 m$\mu$) was used.
(b) The weight ratio of the carbon black to VYLON 200 was 10:90.

COMPARISON 4

A magnetic recording tape was prepared in a manner similar to that in comparison 3, but the weight ratio of the carbon black to VYLON 200 was 40:60.

REFERENCE 1

A magnetic recording tape was prepared in a similar manner as example 1 without the intermediate layer 2, wherein the magnetic layer 5 formed on the carrier strip made of polyethylene telephthalate film.

Table 2 shows surface resistivity, adhesiveness output uniformity and light transmittance of the respective magnetic recording tapes of example 1 to 3, comparisons 1 to 4 and the reference 1.

In preparing Table 2, a testing method for testing the adhesiveness was used. The method was such that the peel-back method in which an adhesive tape, about 5 cm length was fitted to the magnetic face uniformly and then quickly peeled away from the magnetic face so that the adhesiveness was tested by detecting the amount of magnetic acting materials fitted to the peeled adhesive tape and the state of the magnetic layer left on the carrier strip.

Also, resistivity is measured by the method as designated under the section 2, paragraph 7.4 (uniformity) in terms of cassette of International Tape Association.

TABLE 2

| | Amount of carbon black in conductive layer (% by weight) | Surface resistivity ($\Omega$/sq) | Adhesiveness Peel back method | Output uniformity (db) | Light transmittance (%) |
|---|---|---|---|---|---|
| example 1 | | | | | |
| sample 1 | 5 | $5.0 \times 10^{10}$ | ◯ | 0.2 | 0.18 |
| sample 2 | 10 | $4.8 \times 10^{8}$ | ◯ | 0.2 | 0.05 |
| sample 3 | 20 | $7.5 \times 10^{6}$ | ◯ | 0.3 | 0.04 |
| sample 4 | 30 | $4.4 \times 10^{6}$ | △ | 0.4 | 0.03 |
| comparison 1 | 0 | $5.1 \times 10^{12}$ | ⊙ | 0.2 | 0.30 |
| comparison 2 | 40 | $3.7 \times 10^{6}$ | X | 1.3 | 0.02 |
| example 2 | 10 | $4.9 \times 10^{8}$ | △ | 0.2 | 0.06 |
| example 3 | 10 | $5.3 \times 10^{8}$ | △ | 0.2 | 0.06 |
| comparison 3 | 10 | $4.7 \times 10^{11}$ | ◯ | 0.4 | 0.20 |
| comparison 4 | 40 | $2.3 \times 10^{9}$ | X | 2.1 | 0.17 |
| reference 1 | — | $6.0 \times 10^{12}$ | X | 0.2 | 0.30 |

⊙ strong
◯ medium
△ not weak
X weak

As apparent from the Table 2, the magnetic recording tapes having the intermediate layer 2 are improved compared to those of the magnetic recording tape without the intermediate layer.

In addition, as seen in the example 1, the surface resistivity becomes low and the adhesiveness becomes strong by designating the amount of the carbon black contained in the intermediate layer within the range of 5% to 30% by weight.

Referring to the comparison 3 and the comparison 4, it is understood that, when the conventional carbon black is used in the intermediate layer 2, adhesiveness between the magnetic layer and the intermediate layer becomes weak when the surface resistivity of the recording tape is to be low as shown in comparison contrary thereto, when the amount of the carbon black is decreased to improve the adhesiveness, the surface resistivity becomes undesirably high as shown in comparison 3.

On the other hand, as seen in the examples 1 to 3 of the present invention in which the carbon black having a high specific surface area and oil absorption is used in the intermediate layer, the surface resistivity can be lowered less than $5.0 \times 10^{10} \Omega$ with strong adhesiveness. In addition, the output uniformity can be improved to around 0.2 db in the examples 1 to 3 of the recording tape according to the present invention, namely the output uniformity, can be improved compared to the recording tapes of the comparisons 2 to 4.

Referring to FIG. 2, the carrier strip 1 is made of polyesters such as polyethylene telephthalate film having a thickness of 2 to 75μ. The first intermediate layer 6 is formed on the carrier strip 1 and the second intermediate layer 4 containing carbon black particles 3 is formed on the first intermediate layer 6. The magnetic layer 5 is formed on the second intermediate layer 4.

Thus, the intermediate layer 2 consists of the first intermediate layer 6 and the second intermediate layer 4.

A major part of the particles of the carbon black powder 3 is biassed in the intermediate layers 2 towards the magnetic layer 5 formed on the second intermediate layer 4.

The first intermediate layer 6 is formed by way of coating the solution in which resin having strong adhesiveness with the carrier strip 1 is solved so that the first intermediate layer is formed with a thickness within the range of about 0.01μ to 1.0μ when dried. In turn, the first intermediate layer 6 is dried.

The second intermediate layer 4 is formed on the first intermediate layer 6 in a manner similar to that in the first intermediate layer 6 but the carbon black powder 3 is dispersed in the solution. Said second intermediate layer 4 is formed with a thickness of within the range of about 0.05μ to 1.99μ.

In order to improve the adhesiveness between the carrier strip and the intermediate layer, the surface resistivity and the light transmittance of the magnetic recording tape, total thickness of the both of the intermediate layers 6 and 4 is preferably designated within the range of about 0.1μ to 2.0μ.

EXAMPLE 4

The first intermediate layer 6 was formed on the carrier sheet 1 made of polyester film having a thickness of 11μ by coating such solution of 10 parts by weight of VYLON 200 (TOYOBO CO. LTD.) solved in 90 parts by weight of cycrohexanone so as to prepare the first intermediate layer 6 having a thickness of about 0.1μ when dried. After coating, the first intermediate layer 2 was dried. In turn the second intermediate layer 4 was formed on the first intermediate layer 6 with a thickness of about 0.2μ, when dried, by coating the solution made of

| | |
|---|---|
| Ketjen Black E.C. | 1 part by weight |
| VYLON 200 | 9 parts by weight |

| | |
|---|---|
| -continued | |
| cycrohexanone | 90 parts by weight | then the second intermediate layer was dried.

Magnetic coating material was prepared consisting of the following:

| | |
|---|---|
| magnetic powder of cabalt containing $\gamma$-Fe$_2$O$_3$ including cobalt | 80 parts by weight |
| VAGH (vinyl chloride-vinyl acetate alcohol copolymer of Union Carbide Corp.) | 12 parts by weight |
| TAKENATE L-1007 (polyurethane prepolymer of Takeda Chemical Industries, Ltd.) | 8 parts by weight |
| toluene | 50 parts by weight |
| methyl iso-butyl keton | 50 parts by weight |

The above ingredients for magnetic coating were placed in a ball mill and mill for 70 hours.

The magnetic coating material made in a manner as described above was coated on the second intermediate layer 4 to form the magnetic layer 5 having a thickness of 6μ when dried, thereafter the magnetic layer 5 was dried, in turn the magnetic recording sheet thus prepared was cut to prepare the magnetic recording tape having predetermined width.

Referring to FIG. 3, a resinous layer 6 is formed on the carrier sheet 1, and the particles of the carbon black 3 having high oil absorption and large specific surface area are dispersed on the resinous layer 2 having a thickness of 0.1μ to 2.0μ is formed. The magnetic layer 5 is formed on the carbon black layer 3. In this manner the carbon black 3 is biased towards the magnetic layer 5. The amount of the carbon black contained is preferred within the range of 5 to 30% by weight.

EXAMPLE 5

The carrier sheet made of polyester film having a thickness of 11μ was coated by solution consisting of cyclohexanone of 90 parts by weight and 10 parts by weight of VYLON 200 solved therein to form a layer having a thickness of 0.3μ when dried. After the coating and before the layer dried, the dispersion solution in which the carbon black used in the example 1 was dispersed was sprayed on the layer, then the layer was dried by the conventional method. Then the magnetic layer 5 was formed in a manner similar to that of the example 1.

The Table 3 shows the surface resistivity and the adhesiveness of the magnetic recording tape prepared in the examples 4 and 5.

The surface resistivity was measured according to the method designated in the article C 6240 Section 9-4-1 of JIS. The adhesiveness was measured by the peel back method.

TABLE 3

| | surface resistivity ($\Omega$/sq) | adhesiveness |
|---|---|---|
| example 4 | $1.6 \times 10^6$ | strong |
| example 5 | $2.0 \times 10^6$ | strong |
| sample 2 of the example 1 | $4.8 \times 10^8$ | medium |

As understood from the Table 3, in the recording tape shown in examples 4 or 5 in which the carbon black is biassed towards the magnetic layer, the surface resistivity is lowered compared to that of the example 1 in which the carbon black is dispersed uniformly in the intermediate layer.

What is claimed is:

1. A magnetic recording medium comprising a carrier sheet consisting of a non magnetic film, at least one adherently bonded intermediate layer formed on the carrier sheet and a magnetic layer formed on the intermediate layer, said intermediate layer being composed of resinous polymeric material including electrically conductive material made of particles of carbon black having a specific surface area of not less than 700 $m^2/g$ and an oil absorption of not lower than 300 ml (DBP)/100 g, said carbon black being contained in the intermediate layer within the range of 5 to 30% by weight, wherein said electrical conductive material is biased in the intermediate layer towards the magnetic layer.

2. The magnetic recording medium according to claim 1 wherein said carrier sheet is made of a polyester film.

3. The magnetic recording medium according to claim 2 wherein the intermediate layer contains a binder which consists essentially of a high molecular weight polyester.

4. The magnetic recording medium according to claim 1, wherein said intermediate layer is composed of two layers laid together between the carrier sheet and the magnetic layer.

5. The magnetic recording medium of claim 1 wherein the carbon black has a particle size of not more than about 30 m$\mu$.

6. A magnetic recording medium comprising a carrier sheet consisting of a non magnetic film, at least one adherently bonded intermediate layer formed on the carrier sheet and a magnetic layer formed on the intermediate layer, said intermediate layer being composed of resinous polymeric material including electrically conductive material made of particles of carbon black having a specific surface area of not less than 700 $m^2/g$ and an oil absorption of not lower than 300 ml (DBP)/100 g, said carbon black being contained in the intermediate layer within the range of 5 to 30% by weight, wherein said electrical conductive material is biased in the intermediate layer towards the magnetic layer, said magnetic recording medium possessing a decreased surface resistivity and a reinforced bonding force between the magnetic layer and the carrier sheet.

* * * * *